Figure 1:
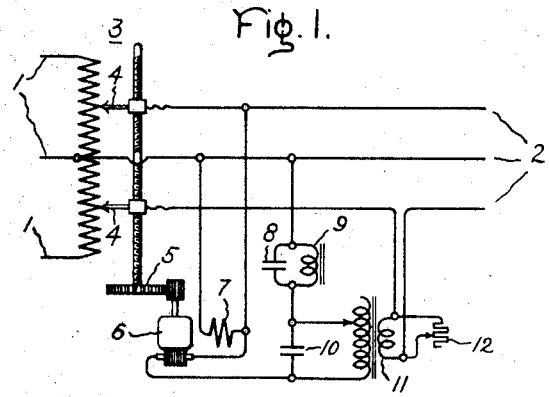

Nov. 22, 1938.        W. KRÄMER         2,137,877

VOLTAGE REGULATOR CONTROL

Filed Feb. 19, 1937

Inventor:
Werner Krämer,
by Harry E. Dunham
His Attorney.

Patented Nov. 22, 1938

2,137,877

UNITED STATES PATENT OFFICE 2,137,877

VOLTAGE REGULATOR CONTROL

Werner Krämer, Berlin-Karlshorst, Germany, assignor to General Electric Company, a corporation of New York Application February 19, 1937, Serial No. 126,604
In Germany May 22, 1936

8 Claims. (Cl. 171—119)

My invention relates to voltage regulator control circuits and more particularly to improvements in line drop compensators which are well adapted, but not limited, to use in circuits of this type which do not employ contacts.

Many voltage regulators and regulating systems for alternating current circuits and alternating current machines employ an electroresponsive device, such as a reversible motor, which is stationary when the voltage is normal and which moves in one direction or the other when the voltage departs from normal, so as to operate suitable regulating apparatus for returning the voltage to normal.

Often such motors are controlled by contact-making devices of one form or another which automatically completed separate circuits for causing forward or reverse operation of the motor in response to departures from normal of the regulated voltage. Recently it has been proposed to substitute apparatus having no contacts and in fact having no moving parts, for automatically controlling the direction of operation of the regulator motor in response to changes in voltage. One form of such static voltage determining apparatus is a parallel ferro-resonant circuit consisting of a capacitor and a self-saturating iron core reactor connected in parallel. These reactive circuit elements are so proportioned that at normal voltage the inductive reactance of the reactor is numerically equal to the capacitive reactance of the capacitor thereby producing parallel resonance and a very high effective impedance. Upon a change in voltage, the inductance value of the reactor changes thereby producing dissonance which is accompanied by a marked decrease in impedance. This permits current to flow through the circuit and if the reversible motor armature is connected in series with this ferro-resonant combination, the motor will be energized when the voltage departs from normal. Depending upon whether the voltage increases or decreases the dissonant circuit will be effectively inductive or effectively capacitive so that the phase of the current in the motor will reverse depending upon whether the voltage is increased or decreased. This reversal in phase is used to secure reversal of operation of the motor.

I have found, however, that in voltage regulator control circuits of the above mentioned contactless and static type, it is sometimes desirable to provide means for varying the voltage setting of the control circuit with changes in operating conditions of the regulated circuit or machine. For example, when such a control circuit is regulating the voltage of a feeder circuit, it is desirable to provide line drop compensating means for correcting the voltage drop between the regulator and the load center.

In accordance with an important feature of my invention, I provide novel and simple line drop compensating or compounding means which is particularly well adapted for use with voltage control systems of the contactless and static type but which is not necessarily limited to use therewith.

An object of my invention is to provide a new and improved voltage regulator control circuit.

Another object of my invention is to provide a novel line drop compensated voltage sensitive ferro-resonant control circuit.

My invention will be better understood from the following description taken in connection with the accompanying drawing and its scope will be pointed out in the appended claims.

Figure 2:
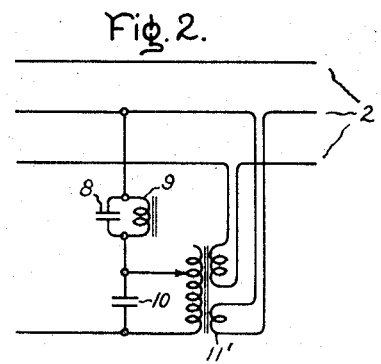
Figure 3:
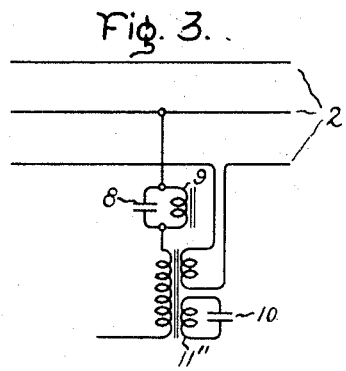

In the drawing, Fig. 1 is a simplified diagrammatic showing of a particular embodiment of my invention; Fig. 2 is a modification thereof for securing complete line drop compensation; and Fig. 3 is a further modification permitting the use of a more economical-sized capacitor.

Referring now to the drawing, and more particularly to Fig. 1, I have shown therein by way of example a three-phase alternating current supply circuit connected to energize a three-phase load circuit 2 through a V-connected variable ratio autotransformer 3. The ratio of transformer 3 is varied, by way of example, by movable tap connections 4 operated through suitable driving mechanism 5 by a reversible motor 6. When the motor 6 turns in one direction, the taps 4 move outwardly from the middle thereby increasing the voltage of the load circuit 2 and when the motor 6 is reversed the taps 4 move inwardly thereby decreasing the voltage of the load circuit 2. The motor 6 is shown by way of example as a shunt type alternating current motor having a field winding 7 connected between the two uppermost conductors of the load circuit 2.

The direction of operation of motor 6 in response to the voltage of load circuit 2 is controlled by connecting its armature across the two uppermost conductors of the load circuit 2 through a parallel ferro-resonant circuit comprising a capacitor 8 connected in parallel with a self-saturating iron core reactor 9. Elements 8 and 9 are so proportioned that they produce resonance when the voltage between the uppermost conductors of load circuit 2 is normal. Under these conditions, the amount of current which can flow through the ferro-resonant circuit is negligible so that the motor is substantially deenergized and does not operate. If now the voltage should increase, the inductive reactance of the reactor 9 decreases due to the self-saturating effect of an increase in current therethrough. The circuit then becomes dissonant and as its inductive reactance is less than its capacitive reactance, a resultant lagging current flows in the armature of motor 6. This causes the motor to turn in a direction such as to cause the contacts 4 on the transformer to move inwardly thereby reducing the voltage of the load circuit 2. This continues until the voltage is again normal at which time resonance will again occur and the motor will come to rest. If now the voltage of circuit 2 falls, the circuit becomes dissonant in the opposite sense, in that the inductive reactance of 9 is higher than the capacitive reactance of capacitor 8, so that a resultant leading current flows through the armature 6. This in effect is a reversal of the current in the armature 6 with respect to the current in the field 7 so that the motor 6 reverses thereby moving the contacts 4 outwardly and increasing the voltage of circuit 2 until it again becomes normal at which time resonance will again occur and the motor will come to rest.

As it is, of course, most convenient and economical to connect the motor and resonant circuit to the load circuit 2 adjacent the regulating transformer 3 and as the actual loads which are connected to the load circuit 2 may be connected thereto at a point relatively remote from the transformer 3, there often occurs a considerable voltage drop in the circuit 2 between the load and the transformer 3. As the purpose of the voltage regulating equipment is to maintain the voltage at the load substantially constant, it is desirable to provide some means for compensating the voltage regulator thus far described for changes in this line drop.

For accomplishing this line-drop compensating function I provide a capacitor 10 connected in series with the motor armature and the parallel resonant circuit, and circulate in this capacitor 10 a current derived from the lowermost conductor of the load circuit 2. This may conveniently be done by means of a current transformer 11 having its primary winding connected in the lowermost conductor of load circuit 2 and having its secondary winding connected across the capacitor 10. The ratio of the transformer 11 is preferably made adjustable.

Assuming unity power factor on the load circuit 2, the current in the lowermost conductor will be at right angles to the voltage between the two uppermost conductors of this circuit. When this current is circulated in capacitor 10, a further 90° or quadrature phase shift is obtained so that the voltage across the capacitor, which is a function of the load current in circuit 2, is opposite in phase with respect to the voltage between the two uppermost conductors of load circuit 2. Consequently, the compensating voltage across capacitor 10 may be made to subtract arithmetically from the voltage applied to the voltage sensitive control element. This means that the voltage of the load circuit will have to increase as the load current through it increases in order that resonance can occur in the ferro-resonant circuit. In other words, the greater the load current the greater the compensating voltage is which is in series with the ferro-resonant circuit and which is subtracted from the main circuit voltage. Consequently, the regulating apparatus will continue to operate until the voltage on the output side of the regulating transformer is higher than normal by an amount corresponding to the voltage across the capacitor 10. By suitably selecting the ratio of the transformer 11 and the size of capacitor 10 this voltage may be made to correspond to the voltage drop in the load circuit for which it is desired to compensate.

The arrangement thus far described is only suitable when compensating for the voltage drop in the resistance of the load circuit 2 because it is only the resistance voltage drop which is opposite to the circuit voltage at unity power factor. However, the load circuit 2 also includes a considerable amount of reactance. In order to secure adequate compensation for the resultant impedance drop made up of both the load circuit resistance and the load circuit reactance, the phase of the voltage across capacitor 10 may be shifted by any suitable means. A simple way of doing this is to connect adjustable resistance 12 in parallel with the primary winding of transformer 11. By adjusting this resistance to a proper value the phase angle of the voltage drop across the capacitor 10 may be made to correspond in magnitude and phase to the actual resultant impedance drop in the load circuit 2.

Fig. 2 shows another way of securing the necessary phase shift in the voltage across capacitor 10 to secure complete line drop compensation. This is done by substituting for transformer 11 a transformer 11' having two primary windings connected respectively in the center and lowermost conductors of the load circuit 2. As these load circuits are commonly 120° out of phase with respect to each other, they may, by suitably choosing the proper ratio of turns of the primary windings carrying these currents, be made to produce a resultant secondary current such as to cause a voltage drop across capacitor 10 which corresponds in phase with the true resultant impedance voltage drop in the load circuit 2.

In Fig. 3, a transformer 11'' is used which has a single primary winding connected in the lowermost conductor of circuit 2 as in Fig. 1, and which has two secondary windings, one connected in the voltage sensitive control circuit and the other connected across the capacitor 10. By stepping up the voltage of the secondary winding connected to the capacitor 10, the size of this capacitor may be decreased thereby decreasing the cost of the compensating capacitor. By means of this inductive connection of the capacitor 10, suitable compensation is secured in substantially the same way as in Fig. 1.

While I have shown and described particular embodiments of my invention, it will be obvious to those skilled in the art that changes and modifications may be made in my invention and I, therefore, aim in the appended claims to cover all such changes and modifications as fall within the true spirit and scope of my invention.

What I claim as new and desire to secure by Letters Patent of the United States is:

1. In combination, an alternating current circuit, means including electroresponsive apparatus connected to respond to the voltage of said alternating current circuit for automatically regulating the voltage thereof, and means including a capacitor for producing a voltage bias with respect to said apparatus such as to compensate said apparatus for the line drop in at least one component of the impedance of said alternating current circuit.

2. In an automatic voltage regulating system, a main circuit, means including a motor for controlling the voltage of said circuit, a voltage responsive control circuit comprising wholly static means for controlling the operation of said motor in response to the voltage of said main circuit, and means for increasing the voltage at which said voltage sensitive means causes operation of said motor as the load on said alternating current circuit increases.

3. In an automatic voltage regulating system, an alternating current circuit, a reversible motor operated voltage regulator for said alternating current circuit, a circuit responsive to the voltage of said alternating current circuit for energizing said motor, said voltage responsive circuit including wholly static means for reversing said motor in accordance with increases and decreases of the voltage of said alternating current circuit from a normal value, and means for biasing the energization of said voltage responsive means in response to the load current in said alternating current circuit.

4. In an automatic voltage regulating system, an alternating current circuit, a motor-operated voltage regulator for said circuit, a parallel ferro-resonant circuit responsive to the voltage of said alternating current circuit for controlling the direction of operation of said motor, and means for producing a voltage bias with respect to said parallel resonant circuit comprising a capacitor in series therewith and an auxiliary transformer for circulating a current in said capacitor in proportion to the current in said alternating current circuit.

5. In combination, an alternating current circuit, means including a parallel ferro-resonant circuit connected to be responsive to the voltage of said circuit for regulating the voltage thereof, an impedance in series with said ferro-resonant circuit, and a variable ratio auxiliary transformer having its primary winding connected to carry current proportional to the current in said alternating current circuit and having a secondary winding connected across said impedance.

6. In combination, a polyphase alternating current circuit, means including a parallel ferro-resonant circuit for regulating the voltage of said circuit, and means including an auxiliary transformer for biasing said ferro-resonant circuit so as to compensate for line drop in said alternating current circuit, said means including an auxiliary transformer having two primary windings connected respectively in different conductors of said polyphase alternating current circuit and having a secondary winding connected to said ferro-resonant circuit.

7. In combination, an alternating current circuit, means including a parallel ferro-resonant circuit for regulating the voltage of said alternating current circuit, an auxiliary transformer having two secondary windings one of which is connected in circuit with said resonant circuit and the other of which is connected across a capacitor, the primary winding of said auxiliary transformer being connected to carry a current proportional to the current in said alternating current circuit.

8. In combination, an alternating current power circuit, a voltage regulator for said circuit, a motor for operating said regulator, a winding on said motor for controlling the starting, stopping and reversing of said motor in accordance with changes in phase of an alternating current obtained by a shunt connection of said winding across said power circuit, a parallel resonant non-linear volt-ampere characteristic circuit connected in series with said winding, an impedance connected in series with said winding and said resonant circuit, means for circulating through said impedance an alternating current proportional to the current in said power circuit, and means for adjusting the ratio of current circulated in said impedance to the current in said power circuit.

WERNER KRÄMER.